Sept. 19, 1961          N. NIEMAN          3,000,635

ARCHERY ARROWS

Filed Nov. 30, 1959

INVENTOR.

NASEEB NIEMAN

BY

*Michael Williams*

Attorney

United States Patent Office 3,000,635
Patented Sept. 19, 1961

3,000,635
ARCHERY ARROWS
Naseeb Nieman, P.O. Box 161, Ravenna, Ohio
Filed Nov. 30, 1959, Ser. No. 856,044
6 Claims. (Cl. 273—106.5)

My invention relates to arrows for use in archery and the principal object of my invention is to provide new and improved arrows for this purpose.

The sport of hunting has renewed interest when a bow and arrow is used because of the increased skill required on the part of the hunter, and a further object of my invention is to provide an arrow construction which will travel true so that the hunter's skill is enhanced, and which will more easily and effectively penetrate the body of an animal being hunted.

In the usual arrow construction having an orthodox type of arrowhead, when the head strikes the body of an animal, its point penetrates the animal carcass but, because the carcass of an animal has a bone frame, the arrow is deflected by engagement with a bone and thus does not effectively enter the carcass at the place intended by the hunter.

My improved construction overcomes the foregoing objections by providing a relatively small arrowhead and a shiftable continuation thereof, the parts being constructed and arranged so that when the arrowhead strikes a bone obstruction, the shiftable continuation is moved, rather than the entire arrow, so that the arrow enters the animal carcass at the place intended by the hunter. Therefore, game is more frequently killed quickly, rather than just wounded only sufficiently that it may crawl away but die later. In this respect my invention provides a more humane hunting medium and one that does not needlessly waste the wild life of the country.

In the drawing accompanying this specification and forming part of this application, there is shown, for purposes of illustration, an embodiment which my invention may assume, and in this drawing:

FIGURE 1 is a plan view of an arrow embodying my invention, a portion of the arrow shaft being broken away, FIGURE 2 is a side elevational view of the construction shown in FIGURE 1, FIGURE 3 is an enlarged sectional view corresponding generally to the line 3—3 of FIGURE 1, and FIGURE 4 is a separated perspective view of parts comprising my preferred embodiment.

Referring to the drawing, the presently preferred embodiment of my invention comprises an arrow shaft 10 which may be formed of any suitable material, such as wood or metal tubing. The rear end of the arrow shaft (not shown) may be of any suitable and usual construction and therefore detailed disclosure thereof is believed unnecessary.

An arrowhead assembly is carried at the forward part of the arrow shaft and comprises an arrowhead at the extreme forward end of the assembly and blade means 12 behind the arrowhead. The blade means 12 is preferably of sector shape and proportioned so that its opposite sides generally form a continuation of respective inclined sides of the arrowhead.

The head assembly provides a socket 14 for receiving the adjoining end of the arrow shaft 10 and this socket has a longitudinally extending opening which receives the blade means 12 and supports the latter for shifting movement crosswise of the longitudinal axis of the arrow and generally parallel thereto.

In order to facilitate production of my improved arrow and to increase precision in manufacture, the herein disclosed embodiment illustrates that the arrowhead assembly may be die stamped and formed, so that great quantities may be produced at low cost.

As best seen in FIGURE 4, the arrowhead assembly comprises arrowhead and socket forming parts 15 and 16 of stamped and formed sheet-metal which are practically identical with the exception that the part 15 carries the arrowhead 11.

The parts 15 and 16 have portions 15a, 16a which are semi-circular in cross-section so that when they are longitudinally abutted and engaged they form the circular socket 14 which receives the arrow shaft 10. The curvature of the portions 15a, 16a diminishes in a direction toward the arrowhead, and the portions are flat at places 15b, 16b and merge with flat, offset portions 15c, 16c by means of curved junctions 15d, 16d.

The forward parts of the flat portions 15c, 16c have an inwardly inclined lip 15e, 16e, the lip 15e merging with the arrowhead 11. In assembled relation, as seen best in FIGURE 2, the inclined lips 15e, 16e abut and the arrowhead 11 is disposed symmetrically with respect to the longitudinal axis of the socket 14.

The flat portions 15c, 16c are spaced to provide an opening 17 which lies along the longitudinal axis of the arrow. Facing surfaces of the flat portions 15c, 16c provide a slide bearing for opposite forwardly disposed sides of the generally flat plate which, in this embodiment, forms the blade means 12. Portions 15a, 16a have notches 15f, 16f in their facing margins to provide a longitudinal opening 18 which is complementary to the opening 17 and which provide a slide bearing for opposite rearwardly disposed sides of the blade means 12. Thus, the flat blade is mounted for shifting action crosswise of the longitudinal axis of the arrow and parallel to the axis thereof.

The blade means 12, as before noted, is sector-shaped and constructed and arranged to generally form a continuation of the arrowhead 11, and for this purpose opposite margins of the blade means are of knife edge, as seen at 19. The curved junctions 15d, 16d have slots 15h, 16h formed therein, and small circular openings 15i, 16i pass through the flat portions 15c, 16c. The blade means 12, as best seen in FIGURE 4, is formed with an elongated slot 20 and a small opening 21.

A wire member 25 is provided to form a pivot point for the blade means 12 and to resiliently hold the latter centralized. As seen in the drawings, an end 25a of the wire member is seated in the slot 16h and a portion 25b of the wire member overlies the outer surface of flat portion 16c. The wire member has a loop 25c which passes through the small openings 16i, 21, and 15i respectively in the parts 16c, 12 and 15c and thus forms a pivot point for blade means 12.

The wire member has a portion 25d extending from loop 25c and overlying the outer surface of flat portion 15c, and an offset portion 25e passing through slot 15h and merging with a flat portion 25f which overlies the adjacent surface of blade means 12. The portion 25f has an angular end 25g which extends through the slot 20 in plate means 12, and the end 25g merges with an offset terminal 25h which underlies the plate means and holds the wire member in position in the plate means.

It will be appreciated that the wire member 25 does not initially have the shape shown in FIGURE 4, since it must be of sufficiently straight wire to enable it to be threaded through the various openings and slots to the finally assembled position. In any event, the wire member 25, or at least that portion of it which extends between slot 15h and opening 20, is sufficiently resilient to yieldably maintain the blade means 12 in the centralized position shown in full lines in FIGURE 1.

The parts 15 and 16, with blade means 12 and wire member 25 suitably assembled therewith, may be held together in any suitable manner. At the present time, it is preferred to weld the parts together along joining marginal surfaces and then grind off any weld flash or excess weld so that the exterior of the arrowhead assembly is smooth.

In operation, when an arrow is shot at and strikes an animal, the arrowhead 11 pierces the hide H and enters the carcass. However, should a bone B be adjacent the point of arrow entrance, a side edge of the blade means 12 will engage the bone and the blade means will be shifted, as shown in dotted lines in FIGURE 1, so that the arrow is not materially deviated from its course and therefore is permitted to strike the intended vital spot of the animal with the full width of the blade means 12.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An improved archery arrow, comprising an arrow shaft, an arrow head at one end of said shaft, and a single flat blade of sector shape immediately behind said arrow head and disposed flatwise in the same general plane, opposite side edges of the blade extending outwardly of respective sides of the shaft, the small part of the blade adjoining the rear of said arrow head so that said blade forms a continuation of the general wedge shape of said arrow head, an opening in said shaft behind said arrow head, and means mounting said blade in said opening for shifting movement in the flatwise plane of the blade.

2. The construction according to claim 1 wherein said blade is a flat sheet-metal member, and wherein said opposite side edges are longitudinally extending cutting edges.

3. The construction according to claim 1 wherein said opening is a flat slot and said blade is slidably confined within said flat slot.

4. The construction according to claim 1 and further including means to yieldably maintain said blade symmetrically of the shaft axis.

5. An improved archery arrow, comprising an arrow shaft, an arrow head assembly at one end of said shaft and comprising a body formed of a pair of complementary members which are rigidly joined to provide a socket at one end for receiving the shaft end, an arrow head at the other end and an intermediate transverse opening immediately behind said arrow head and having flat guide surfaces in the same general plane as said arrow head, and a sector shaped flat blade disposed within said transverse opening with its opposite side edges extending outwardly of respective sides of said body, side surfaces of said body slidably bearing against said flat guide surfaces whereby said blade is guided for shifting in its plane to one side or the other of a position symmetrical with respect to the axis of said arrow, the small part of the blade adjoining the rear of said arrow head so that said blade forms a continuation of the general wedge shape of said arrow head when the blade is in symmetrical position, and means maintaining said blade in operative position.

6. The construction according to claim 5 and includind means providing a single pivot adjacent the small end of said blade and about which the latter shifts, and means to yieldably maintain said blade in symmetrical position.

References Cited in the file of this patent

UNITED STATES PATENTS

| | | |
|---|---|---|
| 834,442 | Aungst | Oct. 30, 1906 |
| 2,549,235 | Ramsey | Apr. 17, 1951 |
| 2,568,417 | Steinbacher | Sept. 18, 1951 |
| 2,806,317 | Minisini | Sept. 17, 1957 |
| 2,859,970 | Doonan | Nov. 11, 1958 |